United States Patent [19]

Ferris

[11] Patent Number: 4,968,047

[45] Date of Patent: Nov. 6, 1990

[54] VIDEO MOUNT FOR SHOPPING CART

[75] Inventor: Gregory W. Ferris, Battle Creek, Mich.

[73] Assignee: United Steel & Wire Company, Battle Creek, Mich.

[21] Appl. No.: 348,334

[22] Filed: May 5, 1989

[51] Int. Cl.$^5$ .............................................. B62B 5/00
[52] U.S. Cl. .............................. 280/33.992; 248/302; 280/DIG. 4; 358/254
[58] Field of Search ..................... 280/33.991, 33.992, 280/33.993, 33.994, DIG. 4; 248/302; 40/308; 358/254, 255, 230

[56] References Cited

U.S. PATENT DOCUMENTS

| | | | |
|---|---|---|---|
| 2,888,761 | 6/1959 | Miller | 280/33.992 |
| 2,890,057 | 6/1959 | Davis | 280/33.993 |
| 2,891,801 | 6/1959 | Sides | 280/33.993 |
| 3,438,644 | 4/1969 | McMillan et al. | 280/33.992 |
| 4,423,888 | 1/1984 | Addison | 40/308 |
| 4,544,141 | 10/1985 | Kellogg | 280/33.992 |

FOREIGN PATENT DOCUMENTS

| | | | |
|---|---|---|---|
| 133235 | 2/1985 | European Pat. Off. | 280/33.992 |
| 3405154 | 8/1985 | Fed. Rep. of Germany | 280/33.992 |
| 2035225 | 6/1980 | United Kingdom | 280/33.992 |

OTHER PUBLICATIONS

Information Resources, Inc. brochure dated 1988 (4 pages).

*Primary Examiner*—Charles A. Marmor
*Assistant Examiner*—Eric Culbreth
*Attorney, Agent, or Firm*—Flynn, Thiel, Boutell & Tanis

[57] ABSTRACT

A shopping cart having an upwardly-opening basket supported on a wheeled base. The basket has a pivotally-mounted rear gate to permit nesting of like carts. A bracket structure is hingedly suported on the cart handle, and has a frame structure disposed generally in the vicinity between the cart handle and the rear edge of the basket. The frame structure is adpated to mount a small video unit thereon. The bracket structure also has stops which engage the side supports for the handle and limit the bracket structure for swinging movement between raised and lowered positions. The bracket structure wil automatically swing upwardly to its raised position in response to nesting of like carts.

14 Claims, 3 Drawing Sheets

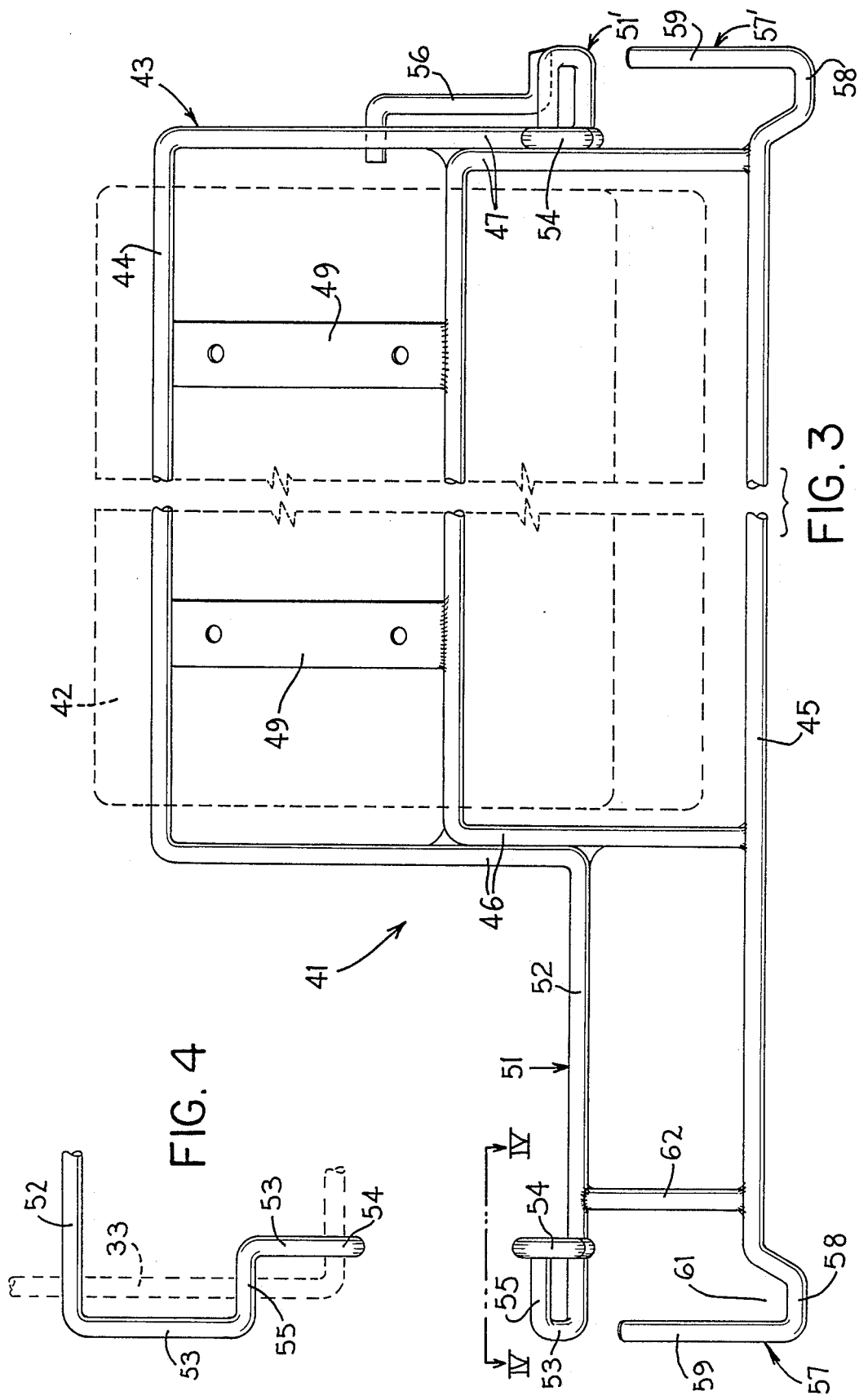

VIDEO MOUNT FOR SHOPPING CART

FIELD OF THE INVENTION

This invention relates to a shopping cart having a mount or bracket mounted thereon in the vicinity of the cart handle to permit securement of a video unit to the cart, which bracket is hingedly connected to the cart, such as to the handle, to facilitate a lower mounting of the video unit on the cart while at the same time enabling the bracket to swing upwardly into a storage position to facilitate conventional nesting of like carts.

BACKGROUND OF THE INVENTION

Shopping carts have long and extensively been utilized in supermarkets and the like. One of the carts which have been utilized for many years employs an upwardly opening basket supported on a wheeled base. The basket typically employs front, side and bottom walls which are rigidly formed from wire, with the side walls having a tapered relationship to permit baskets of like carts to nest one within another. To permit such nesting, the rear of the basket is closed by a rear gate which is hingedly supported adjacent its upper edge, with the lower edge of the gate when in a closed position being abutted against a rear cross wire associated with the basket bottom wall. This gate, which also normally supports thereon a collapsible baby seat assembly, swings inwardly and upwardly into the basket to permit the front end of a second cart basket to nest inside the basket of a first cart. The cart also has a handle which is spaced slightly rearwardly of the basket and extends fixedly and transversely across the basket in the vicinity of the upper rear corners of the side walls, the handle hence being in the vicinity of but spaced slightly rearwardly from the hinged upper edge of the rear gate. Typical carts of this general construction are illustrated by U.S. Pat. Nos. 2,890,057, 2,891,801, and 4,544,171.

Recently, in an attempt to promote sales of merchandise within the supermarket, and to provide added information to customers, it has been proposed and attempted to mount a small video unit on the cart in the vicinity of the handle. This video unit is disposed with its display screen oriented directly toward the customer, when the latter is standing behind the cart so as to grip the handle, whereby the customer can readily view the video screen while pushing the cart. The video unit is activated by small transmitters which are located at various locations throughout the supermarket so as to transmit to the video unit selected information, such as advertisements or information relative to special promotions.

Initial attempts to mount such a video unit on the conventional shopping cart have involved use of a bracket structure which is fixed to the cart in the vicinity of the rear thereof. More specifically, this bracket structure is rigidly fixed to the cart, adjacent the rear handle, and projects upwardly to define a support frame on which the video unit is mounted. This bracket structure, however, necessarily projects upwardly above the cart a substantial extent so as to be at an elevation whereby it does not interfere with conventional nesting of like carts. However, this results in the video unit being disposed at an undesirably high elevation whereby it is not as convenient or comfortable with respect to its visibility to the customer, and it also impairs or restricts the vision of the customer when moving the cart through the supermarket.

Accordingly, it is an object of this invention to provide an improved bracket for mounting a video unit thereon, which bracket can be movably, and more specifically pivotally, mounted relative to the cart, in the vicinity of the handle thereof, so that the video unit in use can be at a lower and more convenient elevation while at the same time the bracket and the video unit thereon can readily swing upwardly into a nonuse position when like carts are nested for storage purposes.

More specifically, according to the present invention, the video-unit bracket is of a generally rigid one-piece structure having a generally upright open frame which mounts thereon the video unit. The frame projects upwardly above the handle in the vicinity between the handle and the rear gate, and has sidewardly projecting stops which bear against the rearwardly-extending handle side supports. The bracket has rearwardly projecting lever arms which are hingedly supported adjacent opposite ends of the handle, and the bracket also has a bottom cross member disposed adjacent the lower edge of the video mount, which cross member is disposed for contact with a rear gate of a second cart when like carts are nested. This permits the bracket and the video unit thereon to pivot upwardly about the handle into a storage position when like carts are nested and the rear gate of a rear cart swings upwardly into contact with and swingably displaces the bracket of a front cart.

Other objects and purposes of the invention will be apparent to persons familiar with structures of this general type upon reading the following specification and inspecting the accompanying drawings.

BRIEF DESCRIPTION OF THE DRAWINGS

FIG. 3 is a view of the bracket, removed from the cart, as appearing generally in the direction indicated by arrows III—III in FIG. 2.

FIG. 4 is a fragmentary view generally along line IV—IV in FIG. 3.

Figure 1:
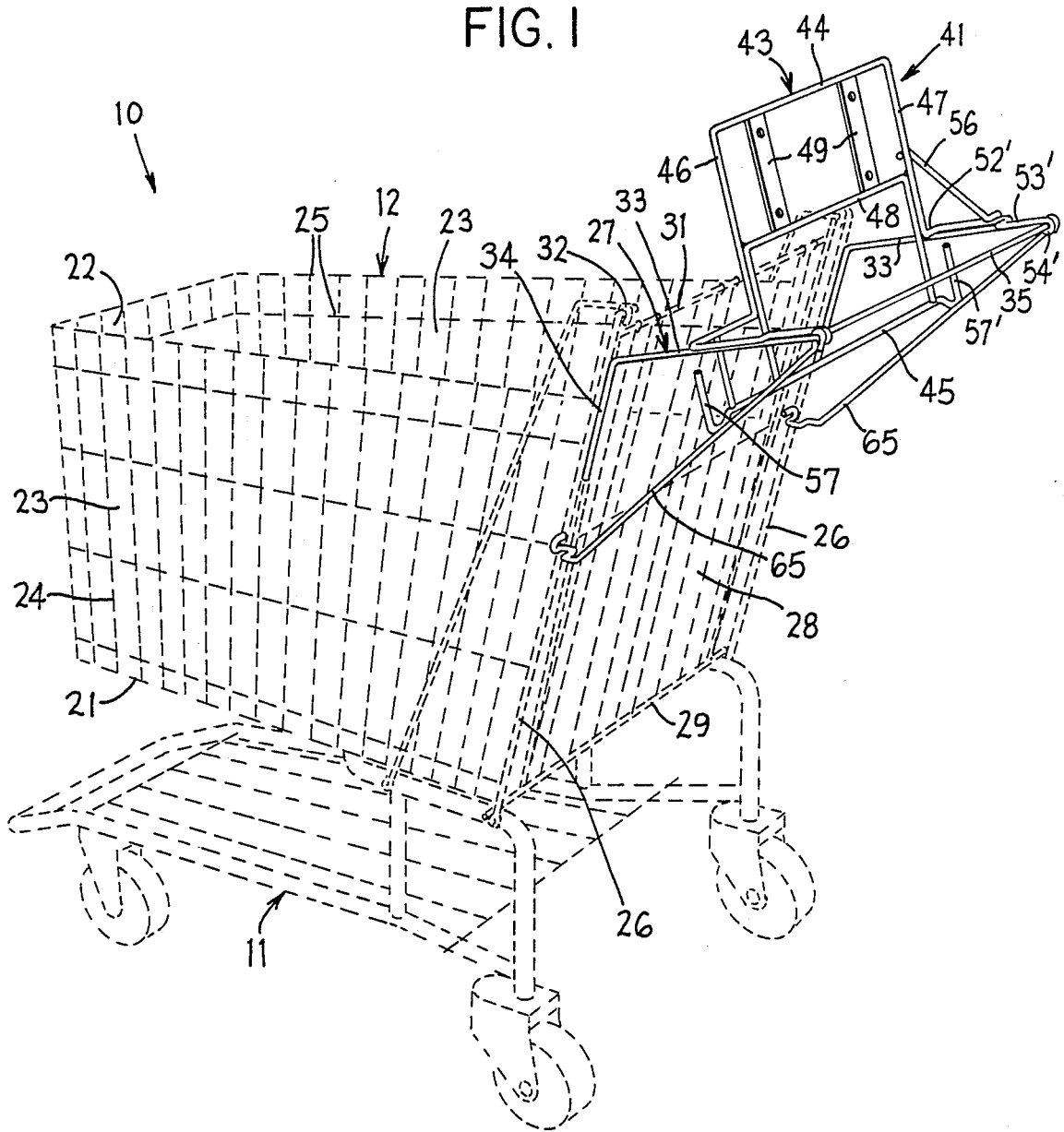
FIG. 1 is a perspective view which illustrates a generally conventional shopping cart in dotted lines, with the cart having the improved video-mount bracket of this invention hingedly mounted thereon.

Certain terminology will be used in the following description for convenience in reference only, and will not be limiting. For example, the words "upwardly", "downwardly", "rightwardly" and "leftwardly" will refer to directions in the drawings to which reference is made. The word "front" will be used with reference to the leading end of the cart as appearing on the left side of FIG. 1, and the word "rear" will be used with reference to the rear or handle end of the cart as appearing on the right side of FIG. 1. The words "inwardly" and "outwardly" will refer to directions toward and away from, respectively, the geometric center of the cart and designated parts thereof. Said terminology will include the words specifically mentioned, derivatives thereof, and words of similar import.

DETAILED DESCRIPTION

FIG. 1 illustrates therein a conventional shopping cart 10 which includes a wheeled base 11 supporting an upwardly opening basket 12.

The basket 12 in the illustrated embodiment is constructed of wire rod and includes a bottom wall 21, an upright front wall 22, and a pair of opposed side walls 23, which walls are all integrally and rigidly joined together. These walls are all formed from a plurality of intersecting metal wires or rods, such as generally vertical rods 24 and generally horizontal rods 25, which rods are suitably welded together at their intersection points to define a gridlike structure. The bottom wall in slightly upwardly sloped as its projects forwardly, and the opposed side walls also have a slight converging relationship therebetween as they project forwardly, which relationships permit the baskets of like carts to be nested one within the other during storage.

The rear vertical edges of the side walls 23 are defined by generally upright rods 26 which have their lower ends fixedly secured to the base. The upper ends of these rods 26 generally project upwardly above the upper edge of the basket side walls. A handle assembly 27 is fixed to and extends between the rods 26, which handle assembly 27 is explained in greater detail below.

The rear of basket 12 is closed by an end gate 28, which gate is also formed from a plurality of intersecting wire rods which form a gridlike structure. The gate 28 has an outer substantially rectangular frame sized so as to movably fit inside the opposed side walls 23, and the lower edge of the gate abuts against an inside surface of a cross rod 29 which is fixed to and extends transversely across the rear edge of the bottom wall. The gate 28 at its upper edge has a cross rod 31, and the gate in the vicinity of the upper corners thereof is provided with appropriate structure, such as hooks 32, for hingedly supporting the gate adjacent its upper edge on the adjacent upper corners of the side walls so that the gate can hence swing inwardly and upwardly about a generally upper horizontal axis into the basket for nesting of like carts.

The basket 12 is also preferably provided with a collapsible baby seat assembly in the interior thereof and mounted on the rear gate, although such assembly has been eliminated from the drawings for convenience of illustration.

The structure of the cart 10, as briefly described, is conventional so that further description thereof is believed unnecessary. Further, the construction of such cart is described in greater detail in U.S. Pat. No. 4,544,171, the disclosure of which is incorporated herein by reference.

As to the handle structure 27, it includes a pair of sidewardly spaced and generally parallel side support members or rods 33 which at their forward ends are fixedly secured to the respective upright posts 26, such as by being provided with downwardly turned legs 34 which are welded to the post 26. These support rods 33 project rearwardly from the basket approximately horizontally through a substantial extent and, adjacent their rearward ends, are rigidly joined together by a handle rod 35 which extends horizontally therebetween. The parts 33, 34 and 35 in the illustrated embodiment are all preferably formed by being suitably bent from a continuous rod member. The handle rod 35 is also preferably provided with a plastic shroud therearound to facilitate gripping by the customer, although such shroud has been eliminated from the drawings for convenience in illustration. The handle rod 35 is disposed at a conventional elevation for convenient gripping by the customer, which elevation is slightly above the elevation of the upper edge of the basket. Further, the handle 35 is normally positioned slightly rearwardly from the upper edge of the rear gate 28, although in the cart of the present invention the rearward spacing of the handle 35 from the upper edge 31 of the rear gate is increased, as by extending the length of the side support rods 33, to provide additional space for the video unit while at the same time positioning the video unit so that it does not interfere either with the baby seat assembly or the interior of the basket.

Figure 2:
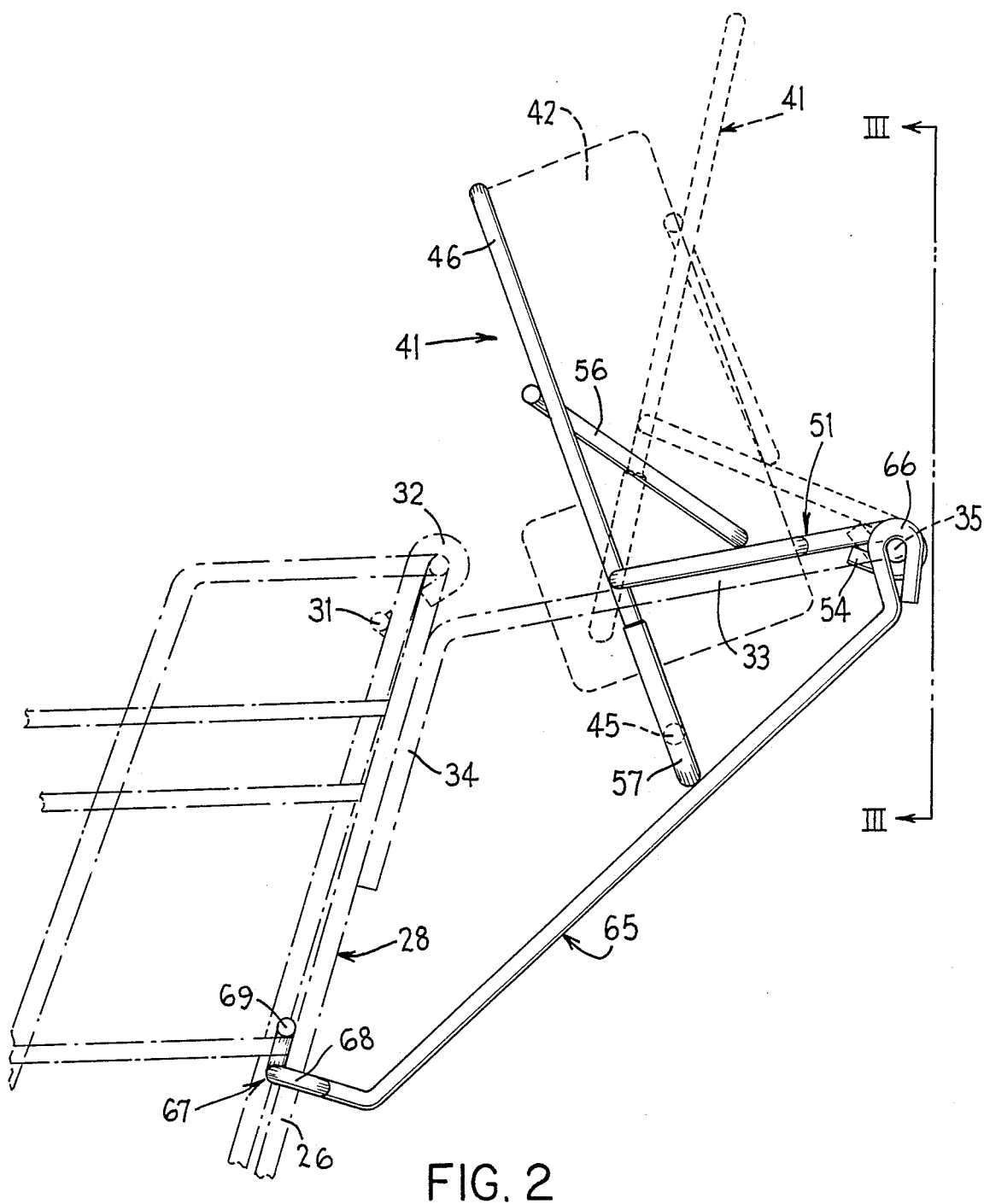
FIG. 2 is an enlarged side elevational view of the video mount bracket secure to the handle of the cart, the bracket being shown in its normal use position by solid lines, and in its raised storage position by dotted lines.

According to the present invention, the cart 10 is provided with a mount or bracket 41 for permitting attachment of a video unit 42, the latter being indicated generally by dotted lines in FIGS. 2 and 3. The bracket 41 comprises a generally rigid one-piece structure formed from a plurality of elements, primarily wire rods, which are suitably fixedly secured together, such as by welding. The bracket 41 is secured to the cart generally in the vicinity between the handle member 35 and the rear gate 28, and is disposed at an elevation so that the video unit 42 is disposed so that its lower edge is approximately at the elevation of the handle 35, with the video unit projecting generally upwardly from this elevation when in its normal position of use, which position is illustrated by the solid-line position of the bracket in FIG. 2.

The bracket 41 includes a generally rectangular mounting frame 43 formed by respective top and bottom rods 44 and 45 which extend in generally parallel and horizontal relationship and which are rigidly joined together by approximately vertically extending side members 46 and 47. The frame 44 also has an intermediate cross member 48 which rigidly extends between the side members 46 and 47 and is spaced downwardly from and generally parallel with the top member 44. This cross member 48 is approximately mid-way between the top member 44 and the bottom member 45. A pair of mounting bars 49 extend between and are rigidly secured to the members 44 and 48. The region between the members 45 and 48 is generally opened.

With the structure of the frame 43 as described above, the video unit 44 is mounted so as to be positioned substantially directly over and fixedly secured to this frame. For example, the video unit 44 has a shallow boxlike configuration, and is disposed so that the rear surface overlies the upper half of the frame and can be suitably fixed to the frame, such as by use of fasteners which extend through openings in the mounting bars 49 for securement to the video unit. The video unit also, in the lower portion thereof, generally has a rearwardly projecting part, such as for a portable power supply (such as a battery pack), which portion hence projects through the open region defined below the intermediate rod 48.

The structure and configuration of the video unit 42 is conventional, and can obviously vary from application to application. One such video unit is manufactured and sold by Information Resources Inc. of Chicago, Ill. The actual construction of the video unit does not comprise a part of the present invention, whereby further description thereof is believed unnecessary.

To movably, and more specifically pivotally, secure the bracket 41 to the cart, the bracket includes mounting arms 51 and 51' which are fixedly secured to opposite sides of the frame 43. These arms 51 and 51' project sidewardly and rearwardly from the frame and function both as a stop structure and as a hinged mounting structure.

More specifically, the arm structure 51 includes an elongate rod part 52 which at its inner end is fixedly joined to the side member 46 and which projects sidewardly outwardly into the vicinity of the adjacent side handle support 33. This rod part 52 at its outer end is rigidly joined to a rod part 53 which projects rearwardly in generally perpendicular relationship to the rod part 52. This rod part 53 adjacent its rearward free end is provided with a hook 54 which is crimped around the handle 35 adjacent the end thereof, which hook 54 is loosely confined around the handle so as to be swingable or pivotable about the handle as an axis. The rod part 53, intermediate its ends, is provided with a transversely extending offset part 55, which is created in the illustrated embodiment by forming the rod part 53 of a generally Z-shaped configuration. The rod part 52 projects sidewardly a sufficient extent so that it projects slightly outwardly beyond the adjacent handle support 33. The rod parts 52 and 53 defining the arm 51 are disposed generally above the side handle support 33, whereby the outer end of rod 52 along with the transverse rod part 55 hence effectively function as stops in that they supportingly bear against the upper surface of the side handle support 33. These stops thus define the normal support position for the bracket 41 and the video unit 42 mounted thereon, which normal support position is the lowermost position and is illustrated by the solid-line position of the bracket in FIGS. 1 and 2.

The other support arm 51' is of a construction which is generally identical to that of the arm 51 except that the arm 51' projects sidewardly only a small extent. That is, the support arm 51' also includes a short sidewardly extending rod part 52' which extends outwardly a small extent beyond the respective side handle support 33, and this rod part 52' is joined to the rearwardly extending rod part 53' which at its rearward end has a hook part 54' which is loosely crimped around the adjacent end of the handle member 35 so as to create a hinged connection. The rod part 53' is also of a generally Z-shaped construction which is generally identical to that of the rod part 53 so as to bear against the upper surface of the respective side handle support 33 to thus define the normal use position, that is the lower position, of the bracket.

To provide additional strength and rigidification, a bracing rod 56 extends at an angle between the frame 43 and the arm 51'. One end of this rod 56 is secured as by welding to the frame side member 47, and the other end of rod 56 is secured as by welding to the rearwardly-extending rod portion 53'.

The bracket 41 also has lower stops for limiting the upward swinging movement. For this purpose, the opposite ends of the lower cross frame member 45 project outwardly beyond the side frame elements 46 and 47 and, adjacent the opposite free ends thereof, is provided with upwardly-opening hook-shaped stop parts 57 and 57'. The stop part 57 has a generally upwardly opening channellike element 58 which has an outer leg 59 which projects upwardly a significant extent until terminating at a free end. This channel part 58 defines therein a generally upwardly opening channel 61 which is, in the normal position of the video bracket, aligned vertically below and spaced downwardly a substantial distance from the respective side handle support 33. The upwardly extending side leg 59 is spaced sidewardly a small distance outwardly beyond the side handle support 33. Hence, when the video bracket is swung upwardly into a raised position as indicated by dotted lines in FIG. 2, the hook part 57 moves upwardly so that the side leg 59 passes upwardly beyond the outer side of the respective side handle support 33, and the handle support 33 moves into the slot 61 until abutting the bottom of the channel member 58, thereby defining the uppermost position of the bracket 41.

The other hook part 57' is of generally identical construction and cooperates with the other side handle support 33 in a similar manner.

In the preferred embodiment of the bracket, the frame 43 for mounting the video unit 42 is preferably disposed closely adjacent one side of the bracket 41, this being the rightward side in the embodiment illustrated by FIG. 3. In this manner, the video unit 42 can hence be disposed more closely adjacent one side of the cart, while at the same time still being readily visible to the cart customer. This sideward offsetting of the video unit, however, provides a greater area of visibility adjacent the other side of the cart, namely the left side in the illustrated embodiment, so as to provide more convenient use of the cart by the customer. Because of this sideward offset of the frame 43, the arm 51 and hook part 57 are spaced sidewardly of the frame through a greater extent, and thus additional strength and rigidity can be provided by securing a vertical cross brace 62 rigidly between the rod part 52 and the hook part 57.

To also provide increased strength and stability, the cart is also preferably provided with a pair of support braces 65 for the rearwardly-cantilevered handle structure 27. More specifically, a pair of substantial identical such braces 65 are provided, one being connected between each end of the handle rod 35 and the adjacent rearward edge of the basket side wall. For example, the rod 65 at one end is provided with a hook part 66 which is fixedly secured relative to the respective side handle support 33. This fixed securement in the illustrated embodiment is accomplished by crimping the hook part 66 around the handle 35 directly adjacent the outer free end of the side support 33. The brace 65 then projects downwardly and forwardly in angular relationship from the hook 66 so as to terminate in a front hook part 67 which secures to the rear vertical edge of the respective side wall at a location spaced downwardly from the upper corner thereof. This hook part 67 includes a first partial loop part 68 which partially wraps around the upright rod 26 and which then joins to another loop part 69 which is crimped around one of the horizontally extending wire rods of the basket side wall. While the opposite ends of the brace 65 could obviously be fixedly secured by welding or the like, nevertheless the use of crimped-type hooks is preferred since such braces 65 can then be conveniently retrofitted to existing carts.

The pair of braces 65 are sidewardly spaced apart, and the region therebetween is generally open so that the braces do not interfere with nesting of like carts.

Further, in the preferred embodiment, the brace 65 is preferably positioned in angular relationship such that the bracket 41, when in its normal lowermost position, is disposed so that the lower parts of the channel members 58 defining the hooks 57 and 57' substantially bear against the upper surfaces of the braces 65, substantially as illustrated in FIG. 2, to thereby further stabilize and distribute the load of the bracket.

The operation of the cart with the video unit mounted thereon will be briefly summarized.

In normal use, the bracket 41 is disposed in the position illustrated by solid lines in FIG. 2, in which position the bracket 41 is hingedly mounted about a sidewardly extending and substantially horizontal axis defined by the longitudinal axis of the handle rod 35. The bracket 41 is maintained in this use position due to the support arms 51 and 51' resting against the upper surface of the side handle supports 33, with this position being further stabilized by the channel members 58 associated with the U-shaped stops bearing against the braces 65. In this position, the bracket and video unit are disposed, substantially in their entirety, between the rear gate 28 and the handle 35, and thus do not interfere with conventional use of the basket. Further, the video unit 42 is disposed so that the lower part thereof is disposed approximately at the elevation of the handle 35, and then projects upwardly therefrom at a slight forward inclination so that the screen of the video unit, which screen is on the right side of the unit shown in FIG. 2, can thus be conveniently located to facilitate the customer's visibility of the screen. At the same time, the positioning of the video unit is such that the customer still has good forward visibility by looking downwardly over the unit to have proper visibility for moving the cart through the aisle of a supermarket. This visibility is further facilitated and increased by the fact that the frame 43 and the video unit mounted thereon are offset to one side of the cart.

When nesting of like carts is desired, the basket of a second cart is inserted forwardly into the basket of a first cart, thereby causing the rear gate of the first cart to swing upwardly into its basket. This nesting of only two carts, however, does not initially cause any movement of the video bracket on the first cart since the basket of the second cart will pass under the bracket. However, when the basket of a third cart is nested into the basket of the second cart, this causes the rear gate of the second cart to swing upwardly and, in doing so, the rear gate on the second cart contacts the lower cross rod 45 on the bracket of the first cart, thereby causing the video bracket 41 on the first cart to swing upwardly into the raised storage position illustrated by dotted lines in FIG. 2. The bracket will be maintained in this raised position so long as the third cart is nested within the second cart and maintains the rear gate of the second cart in its raised position. When the carts are denested, the weight of the video bracket will automatically swing the unit back into its normal use position.

In the video bracket illustrated and described herein, most of the bracket is created by forming a minimal number of components from wire rod, which wire rod is suitably bent to form various parts of the bracket. For example, the top frame member 44, the upper parts of the side frame members 46 and 47, and the arms 51 and 52 are all formed by being bent from a single wire rod member. The lower parts of the side frame elements 46 and 47 and the intermediate cross rod 48 are also formed by being bent from a single wire rod member. The lower cross rod 45 and the hook parts 57 and 57' are also formed by being bent from a single rod member. Hence, the primary structure of the bracket, except for the braces 56 and 62 and the mounting bars 49, is thus formed from three elongate wire rod members which are suitably bent to provide the desired structure and configuration, with these three formed wire rod members then being suitably welded together. However, it will be apparent that while this construction is desirable from a manufacturing cost and efficiency standpoint, the video bracket can obviously be constructed using numerous other structures and techniques.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a shopping cart having a wheeled base, an upwardly opening basket mounted on said base, the basket having a pair of opposed side walls, and a handle structure fixedly secured to said basket and projecting rearwardly therefrom, said handle structure including a pair of sidewardly spaced handle supports which are fixed relative to the side walls in the vicinity of the upper rear edges thereof and which project rearwardly therefrom and terminate in rear outer ends which are rigidly joined together by a transversely and generally horizontally extending handle member, the improvement comprising a bracket structure movably mounted on said handle structure and adapted for mounting a video unit thereon, said bracket structure including: a support frame adapted to have the video unit secured thereto, mounting means which connects to said handle structure for permitting movement of said bracket structure between a lower normal use position and an upper position permitting nesting of like carts, and stop means cooperating with said cart for defining said lower position, said mounting means pivotally connecting said bracket structure to said handle structure for swinging movement between said lower and upper positions, said mounting means being pivotally connected to said handle structure, said support frame being disposed generally in the vicinity between said handle member and a rear edge of said basket when said bracket structure is in said lower position, said frame projecting upwardly above the elevation of the handle member and being slightly forwardly inclined as it projects upwardly, said mounting means including a pair of arm members which are fixed to opposite sides of said frame and which project rearwardly therefrom and have rearward outer ends thereof pivotally secured to said handle member adjacent opposite ends thereof so that said bracket structure pivotally swings about said handle member between said upper and lower positions, and said stop means including said arm members having stop portions associated therewith which overlie and engage the respective side handle supports at a location disposed forwardly from the handle member for normally supporting the bracket structure in said lower position.

2. A cart according to claim 1, wherein said bracket structure has a lowermost cross rod which extends generally parallel with said handle member and is spaced slightly forwardly from and slightly below the elevation of the handle member when the bracket structure is in said lower position, said lower cross rod being disposed for engagement by a gate of a second cart during nesting of like carts to cause swinging of the bracket structure into the upper position.

3. A cart according to claim 1, wherein said bracket structure includes lower stops which are disposed under the respective side handle supports and which engage the underside of said side handle supports for defining said upper position.

4. In a shopping cart having a wheeled base, an upwardly opening basket mounted on said base, the basket having a pair of opposed side walls, and a handle structure fixedly secured to said basket and projecting rearwardly therefrom, said handle structure including a pair of sidewardly spaced handle supports which are fixed relative to the side walls in the vicinity of the upper rear edges thereof and which project rearwardly therefrom and terminate in rear outer ends which are rigidly joined together by a transversely and generally horizontally extending handle member, the improvement comprising a bracket structure movably mounted on said handle structure for permitting movement of said bracket structure between a lower normal use position and an upper position permitting nesting of like carts, said bracket structure including a support frame adapted to have the video unit secured thereto, said bracket structure comprising a generally rigid one-piece structure having a pair of sidewardly-spaced arms which project rearwardly of the cart, said arms having portions associated with the rearward ends thereof which pivotally engage said handle member adjacent opposite ends thereof for pivotally supporting said bracket structure on said handle structure, and said arms having stop portions associated therewith which normally overlie and engage upper surfaces of the respective side handle supports for maintaining the bracket structure in said lower position.

5. A cart according to claim 4, wherein said support frame is disposed generally in the vicinity between said handle member and a rear edge of said basket when said bracket structure is in said lower position, said support frame projecting upwardly above the elevation of the handle member and being slightly forwardly inclined as it projects upwardly, and said pair of arms being fixed to opposite sides of said support frame and projecting rearwardly therefrom and having rearwardly outer ends thereof pivotally secured to said handle member adjacent opposite ends thereof so that said bracket structure pivotally swings about said handle member between said upper and lower positions.

6. In a shopping cart having a wheeled base, an upwardly opening basket mounted on said base, the basket having a pair of opposed side walls, and a handle structure fixedly secured to said basket and projecting rearwardly therefrom, said handle structure including a pair of sidewardly spaced handle supports which are fixed relative to the side walls in the vicinity of the upper rear edges thereof and which project rearwardly therefrom and terminate in rear outer ends which are rigidly joined together by a transversely and generally horizontally extending handle member, the improvement comprising a bracket structure movably mounted on said handle structure and adapted for mounting a video unit thereon, said bracket structure including: a support frame adapted to have the video unit secured thereto, mounting means which connects to said handle structure for permitting movement of said bracket structure between a lower normal use position and an upper position permitting nesting of like carts, and stop members associated with said mounting means and which overlie and engage the respective handle supports forwardly of the handle member for normally supporting the bracket structure in said lower position.

7. A cart according to claim 6, wherein said support frame is disposed forwardly from said handle member when said bracket structure is in said lower position, said support frame projecting upwardly above the elevation of the handle member and being slightly forwardly inclined as it projects upwardly, and said mounting means including a pair of arm members which are fixed to opposite sides of said frame and which project rearwardly therefrom and have rearward outer ends thereof pivotally secured to said handle member adjacent opposite ends thereof so that said bracket structure pivotally swings about said handle member between said upper and lower positions.

8. A cart according to claim 6, wherein said mounting means pivotally connects said bracket structure to said handle structure for swinging movement between said lower and upper positions.

9. A cart according to claim 6, including contact means connected to said mounting means and positioned forwardly of and below said handle member when said bracket structure is in said lower normal use position for directly contacting an adjacent like cart during nesting so as to be carried by the adjacent like cart for movement of said bracket structure from said lower normal use position to said upper position.

10. A cart according to claim 9, wherein said bracket structure includes lower stops which are disposed under the respective side handle supports and which engage an underside of said side handle supports for defining said upper position.

11. A cart according to claim 10, wherein said contact means is a lowermost cross rod on said bracket structure which extends generally parallel with said handle member and is spaced slightly forwardly from and slightly below the elevation of the handle member when the bracket structure is in said lower position.

12. In a shopping cart having a wheeled base, an upwardly opening basket mounted on said base, the basket having a pair of opposed side walls, and a handle structure fixedly secured to said basket and projecting rearwardly therefrom, said handle structure including a pair of sidewardly spaced handle supports which are fixed relative to the side walls in the vicinity of the upper rear edges thereof and which project rearwardly therefrom and terminate in rear outer ends which are rigidly joined together by a transversely and generally horizontally extending handle member, and a bracket structure movably mounted on said handle structure, the improvement wherein said bracket structure comprises a support frame adapted to have the video unit secured thereto, a pair of elongate mounting arms connected to said handle structure for permitting movement of said bracket structure between a lower normal use position and an upper position permitting nesting of like carts, each said mounting arm being pivotally supported at a rear end thereof adjacent a respective end of said handle member, said mounting arms projecting forwardly and approximately horizontally from said handle member when the bracket structure is in said lower position, said support frame being fixed to and between said mounting arms adjacent forward ends thereof so that the support frame is spaced forwardly from said handle member and extends transversely between said handle supports, said support frame projecting transversely from said mounting arms so as to be disposed at least partially vertically above said handle member while being spaced forwardly therefrom, and stop means cooperating with said cart for defining said lower position.

13. A cart according to claim 12, including contact means connected to said mounting arms and positioned forwardly of and below said handle member when said bracket structure is in said lower normal use position for directly contacting an adjacent like cart during nesting so as to be carried by the adjacent like cart for movement of said bracket structure from said lower normal use position to said upper position.

14. A cart according to claim 13, wherein said contact means comprises an elongate rod which is fixed to said support frame and extends transversely of the space between the handle supports, said rod being at an elevation below said handle member when the bracket structure is in said lower position.

* * * * *

UNITED STATES PATENT AND TRADEMARK OFFICE
CERTIFICATE OF CORRECTION

PATENT NO. : 4,968,047

DATED : November 6, 1990

INVENTOR(S) : Gregory W. Ferris

It is certified that error appears in the above-identified patent and that said Letters Patent is hereby corrected as shown below:

Column 9, line 19; change "the" to ---a---.

Column 9, line 39; change "rearwardly" (second occurrence) to ---rearward---.

Column 10, line 49; change "the" to ---a---.

Signed and Sealed this

Twenty-first Day of July, 1992

Attest:

DOUGLAS B. COMER

Attesting Officer

Acting Commissioner of Patents and Trademarks